Jan. 26, 1960
E. W. BARNES
2,922,515
RECEPTACLE FOR USE IN MOTOR VEHICLES
Filed Sept. 4, 1956
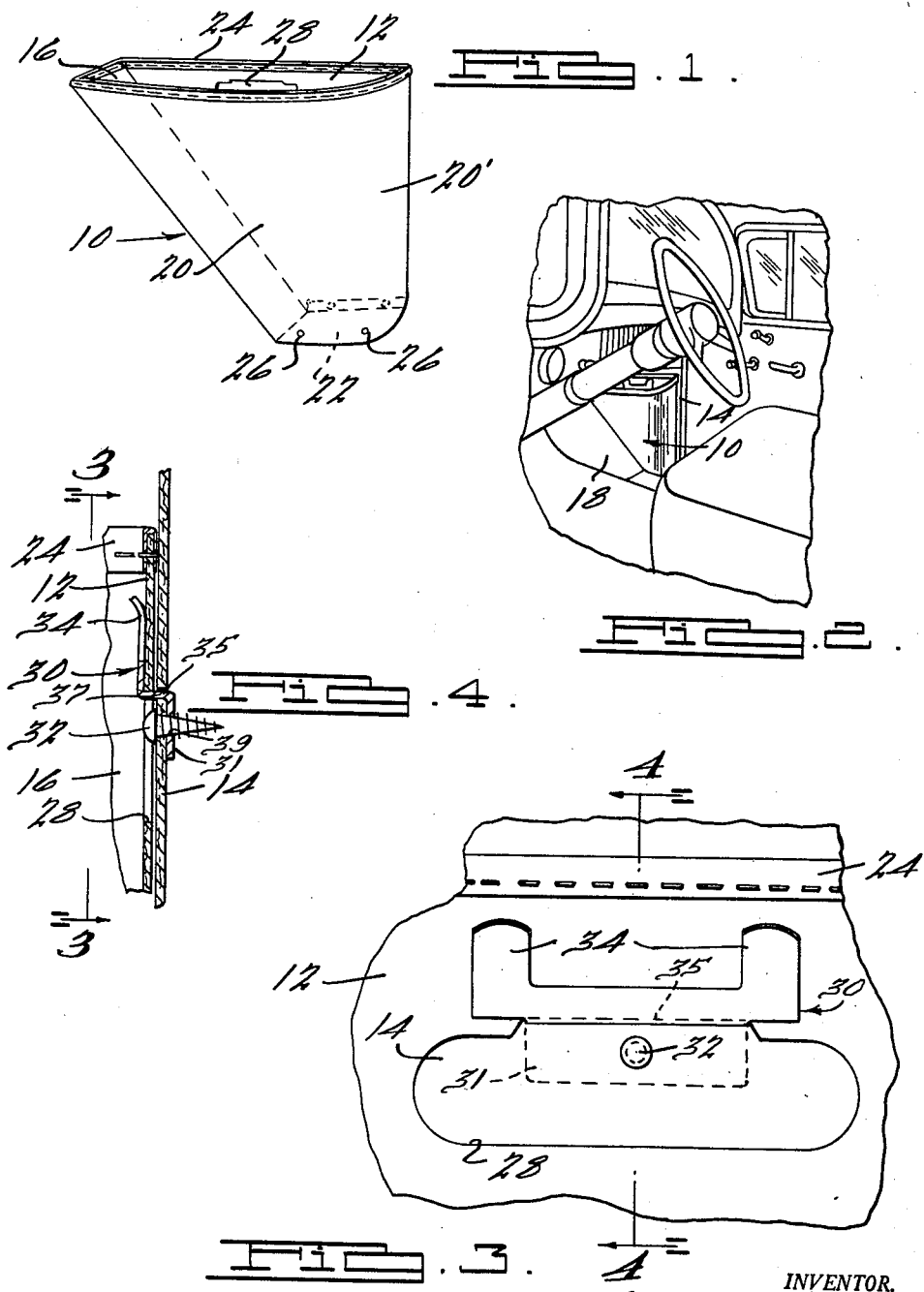
INVENTOR.
Eugene W. Barnes
BY
Harness, Dickey & Pierce
ATTORNEYS

United States Patent Office 2,922,515
Patented Jan. 26, 1960

2,922,515

RECEPTACLE FOR USE IN MOTOR VEHICLES

Eugene W. Barnes, Lansing, Mich., assignor to Michigan Modern Engineering Company, Lansing, Mich., a corporation of Michigan Application September 4, 1956, Serial No. 607,799

1 Claim. (Cl. 206—19.5)

This invention relates to receptacles and particularly to an improved receptacle adapted for use as a waste receptacle, and for other uses and uniquely designed to be supported in a rigid but easily detachable manner in the passenger compartment of a motor vehicle.

An important object of the invention is to provide such a receptacle which is of substantial size, yet which is adapted for installation in a position which does not obstruct any normally used space within the vehicle; which does not interfere with ingress or egress of passengers, yet which provides for ready accessibility to the receptacle.

A further object is to provide such a receptacle which can be installed quickly and easily by persons lacking in mechanical aptitude, which requires only a single screw to effectively secure it in such manner that the receptacle can thereafter be easily removed and replaced without disturbing such screw, which is of attractive appearance and which, further, is so designed as to be usable as an effective receptacle or holder for other articles which do not fall in the category of waste, such, for example, as bottles and other containers for foodstuffs and the like. Such other articles may, with the aid of my invention, be held in a convenient accessible but out of the way position while effectively guarded against accidental spilling or breakage.

With increasing automobile traffic the problem of highway litter has received increasing attention. Discarding of paper, food scraps and other wastes from automobiles onto the road not only is undesirable from an aesthetic point of view, but is also now prohibited by statute in many areas. The disposal of waste material that tends to accumulate in automobiles is an ever mounting problem, particularly to families or other groups traveling a substantial distance. The provision of a receptacle which is large enough to constitute an effective holder for waste materials and for such other uses as mentioned previously presents a special problem because of the full utilization which is made of the relatively confined space within the passenger compartment.

A more specific object is to provide such an improved receptacle for automobile use, which is relatively narrow in its transverse dimension, but of substantial height and length, and shaped to fit closely against the kick pad at one side of the forward portion of the front part of the passenger compartment and in the corner formed by the intersection of the kick pad with the front floor and toe board.

A still further object is to provide improved means to detachably support such a receptacle upon a composition interior wall panel of an automobile.

The invention will explained in greater detail in connection with the accompanying drawing of which:

Figure 1 is a perspective view of a receptacle according to the invention;

Fig. 2 is a perspective view of a receptacle according to the instant invention installed in the front passenger compartment of an automobile;

Fig. 3 is an elevational view of a portion of the receptacle shown in Fig. 1, the view being taken along the section line 3—3 of Fig. 4; and Fig. 4 is a cross-sectional view of the portion of the receptacle shown in Fig. 3 taken along the section line 4—4 thereof.

A receptacle according to a preferred embodiment of the invention and as shown in the drawing, may be made from a single piece of flexible, resilient sheet material folded and stitched together to form an open-top container 10, as shown in Figs. 1 and 2. The sheet is folded to form a substantially flat, vertical back wall 12 and a front wall 20, these two walls being generally parallel and alike in their dimensions and each being in the general shape of a trapezoid. The flat back wall 12 is adapted to fit snugly and smoothly against an interior side wall 14 of an automobile. The sheet also forms a relatively narrow, rectangular, second substantially flat wall 16 joining the front and back walls and which slopes downwardly and inwardly toward the bottom of the basket. The sloping wall 16 is adapted to fit against or closely adjacent the forward sloping portion, or toeboard 18 of the floor of an automobile. The wall opposite to the narrow wall 16 is formed by a curved portion 20' integral with the front wall and adapted to be positioned vertically. A horizontal floor panel 22 completes the structural form of the receptacle, the top being open. A binding, such as a tape 24, may be stitched or glued around the upper edge of the receptacle to conceal the edges of the sheet and to improve the wearing characteristics of the receptacle. The floor panel 22 may be secured to the side walls by rivets 26, or any other convenient means, such as an adhesive.

The receptacle, it will be noted, is relatively narrow and is adapted to fit against the kick pad 14 in an area opposite that occupied by the feet and legs of the passengers. This, it will be recognized, is an area where the full lateral width is not utilized even with a full load of passengers, since the feet and legs occupy less width than the upper portions of the body, yet the receptacle is readily accessible for use and occasional removal for emptying.

Referring now to Figs. 3 and 4, the vertical back wall 12 is provided with a transverse slot 28 shaped somewhat like a widened and inverted keyhole to engage a bracket 30 for detachably mounting the receptacle on the side wall 14 of an automobile. The bracket 30 is preferably of stepped or double bent form in cross section, as best shown in Fig. 4, including a lower plate portion 31 and an upper retaining portion 34 connected together by a horizontal, shelf-like portion 35. The bracket 30 is preferably attached to a side wall portion of the automobile by first cutting a simple straight, horizontal slit 37 in the side wall, preferably in the kick pad 14, as shown, sufficiently long to accommodate the lower plate portion 31. This portion 31 of the bracket is then inserted through the slit 37 and the bracket is permanently secured to the side wall as by one or more screws 32 passed through the side wall 14 and into apertures 39 in the portion 31. This method of attaching the bracket 30 is preferred, especially when the wall panel 14 is made of a fibrous material, because the weight of the receptacle 10 and its contents is transmitted through the shelf-like portion 35 of the bracket to a relatively large area of the panel 14, thus minimizing any tendency of the panel 14 to tear or deform. Also, a single screw is adequate since the slit 35 holds the bracket against tilting. Thus, the receptacle may be firmly held in position in an automobile, yet at the same time be readily removable for emptying.

A receptacle according to the invention is particularly adapted to fit in a forward part of an automobile body and to extend into close proximity with both the side wall 14 and the sloping forward portion 18 of the floor of the automobile. It may also be of substantial height and length and, therefore, of relatively large capacity. The exposed front wall 20 of the receptacle, although generally flat, is preferably curved at the front corner, as indicated at 20′, to improve its appearance and to minimize the danger that it will be struck in such manner as to tend either to injure or dislodge it or to create inconvenience. The receptacle may, of course, be mounted in any other desired location within an automobile, such as at the left-hand side, or upon one of the doors, or upon the back of the front seat where it would be accessible to passengers riding in the rear set of the automobile, although the kick pad installation shown is regarded as of particular advantage where it is contemplated that a full passenger load will be carried in the vehicle, and it will be noted that my invention permits taking especial advantage of the available space in this location.

What is claimed is:

In an automobile having a passenger compartment and a kick pad panel along the lower forward wall thereof, a receptacle and supporting bracket therefor mounted on the kick pad panel, said receptacle comprising an open topped container made of a resilient sheet material having one substantially flat vertical side wall fitted snugly against the kick pad panel and a sloping side wall fitted against the sloping forward floor of the automobile, said vertical side wall defining an aperture shaped to engage a bracket for supporting said container upon the panel, said bracket comprising a single reversely bent metal plate having two horizontally offset vertically extending legs connected together by a horizontal portion, the horizontal offset between said vertical legs being substantially equal to the combined thicknesses of the panel and said vertical side wall, said bracket being mounted on the panel with said horizontal portion extending through a slot therein so that the load imposed on the panel by said receptacle and bracket is distributed over the entire length of said horizontal portion.

References Cited in the file of this patent

UNITED STATES PATENTS

| | | |
|---|---|---|
| 931,549 | Adams | Aug. 17, 1909 |
| 1,937,001 | Waldron et al. | Nov. 28, 1933 |
| 2,426,113 | Northcutt | Aug. 19, 1947 |
| 2,537,050 | Gluck | Jan. 9, 1951 |
| 2,778,554 | Porkola | Jan. 22, 1957 |